United States Patent [19]
Simmons

[11] Patent Number: 6,026,632
[45] Date of Patent: Feb. 22, 2000

[54] PACKAGING SYSTEM AND METHOD INCLUDING CUSHIONING CONVERSION MACHINE WITH SLOPED CHUTE AND AUTO-FEED

[75] Inventor: James A. Simmons, Painesville Township, Ohio

[73] Assignee: Ranpak Corp., Concord Township, Ohio

[21] Appl. No.: 09/002,702

[22] Filed: Jan. 5, 1998

Related U.S. Application Data

[63] Continuation of application No. PCT/US96/11348, Jul. 3, 1996.
[60] Provisional application No. 60/000,799, Jul. 5, 1995.
[51] Int. Cl.[7] .................................................... B65P 63/00
[52] U.S. Cl. ............................ 53/435; 53/139.5; 53/472; 53/493; 53/520; 493/352; 493/464; 493/967
[58] Field of Search ................................ 53/139.5, 155, 53/238, 391, 435, 445, 472, 474, 493, 520; 493/350, 352, 354, 390, 464, 967

[56] References Cited

U.S. PATENT DOCUMENTS

| | | |
|---|---|---|
| 3,509,797 | 5/1970 | Johnson . |
| 3,621,981 | 11/1971 | Nimmo, Jr. et al. . |
| 4,008,796 | 2/1977 | Aylon . |
| 4,026,198 | 5/1977 | Ottaviano . |
| 4,085,662 | 4/1978 | Ottaviano . |
| 4,109,040 | 8/1978 | Ottaviano . |
| 4,237,776 | 12/1980 | Ottaviano . |
| 4,557,716 | 12/1985 | Ottaviano . |
| 4,619,635 | 10/1986 | Ottaviano . |
| 4,650,456 | 3/1987 | Armington . |
| 4,699,609 | 10/1987 | Komaransky et al. . |
| 4,717,613 | 1/1988 | Ottaviano . |
| 4,750,896 | 6/1988 | Komaransky et al. . |
| 4,968,291 | 11/1990 | Baldacci et al. . |
| 5,542,232 | 8/1996 | Beierlorzer . |

FOREIGN PATENT DOCUMENTS

PCT/US94/ 13380  5/1995  WIPO .

*Primary Examiner*—Daniel B. Moon
*Attorney, Agent, or Firm*—Renner, Otto, Boisselle, & Sklar, P.L.L.

[57] ABSTRACT

A packaging system and method according to the invention are generally characterized by a cushioning conversion machine for forming and dispensing cut sections of a cushioning product through a discharge outlet, an inclined dispensing chute for sequentially receiving the cut sections of the cushioning product, a cut section presence detector for detecting the presence of a cut section on the inclined chute at a pick-up location remote from the discharge outlet of the conversion machine, and a controller which initiates dispensing of a cut section of cushioning product in response to a detected absence of a cut section by the cut section presence detector. The dispensing chute, which is located adjacent the discharge opening for receiving the cut sections of the cushioning product, has a downwardly sloped bottom surface onto which the cut section of the cushioning product is deposited for sliding by gravity to a lower end of said dispensing chute where an abutment forms a stop engageable by a leading end of the cut section. The abutment or stop thus prevents further downward movement of the cut section and thereby holds the cut section at the pick-up position. The chute also has upright side walls for guiding the cut section along the sloped bottom surface and a downwardly inclined top wall adjacent the discharge outlet of the conversion machine. The chute at its lower end has an open top through which the cut section may be removed form the chute.

20 Claims, 5 Drawing Sheets

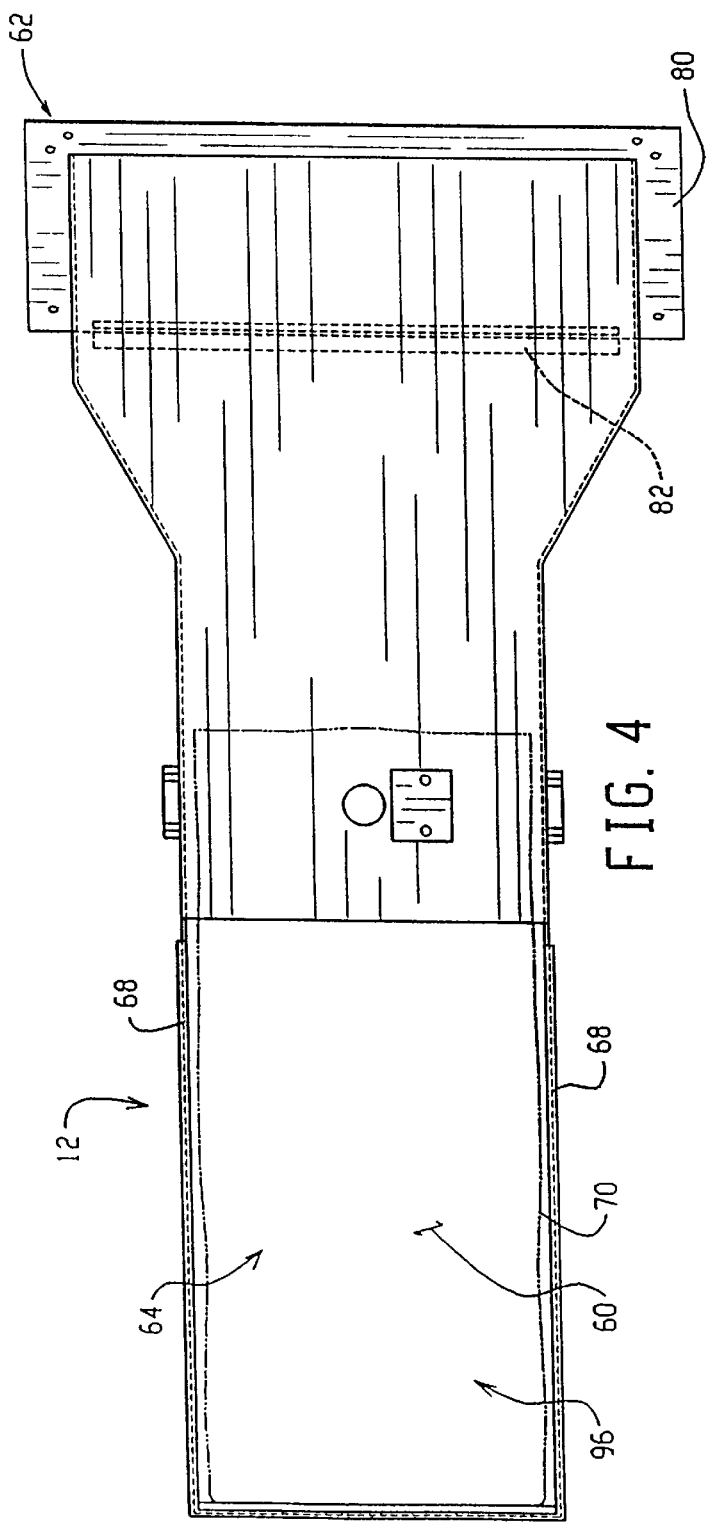
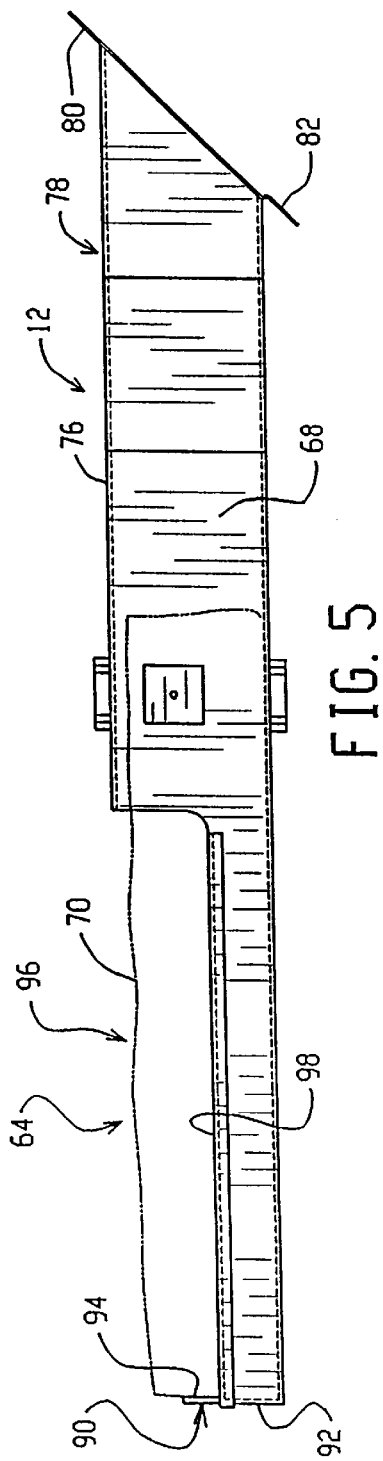

PACKAGING SYSTEM AND METHOD INCLUDING CUSHIONING CONVERSION MACHINE WITH SLOPED CHUTE AND AUTO-FEED

This application claims the benefit of U.S. provisional application No. 60/000,799 filed Jul. 5, 1995. This application is a continuation of PCT/US96/11348, filed Jul. 3, 1996.

FIELD OF THE INVENTION

The invention herein described relates generally to a packaging system and method employing a cushioning conversion machine for converting stock material into a cushioning product and, more particularly, to a dispensing device and method for automatically presenting a measured length of dunnage at a location for convenient pick-up by a packaging person or otherwise.

BACKGROUND OF THE INVENTION

In the process of shipping an item from one location to another, a protective packaging material is typically placed in the shipping container to fill any voids and/or to cushion the item during the shipping process. Some commonly used protective packaging materials are plastic foam peanuts and plastic bubble pack. While these conventional plastic materials seem to perform adequately as cushioning products, they are not without disadvantages. Perhaps the most serious drawback of plastic bubble wrap and/or plastic foam peanuts is their effect on our environment. Quite simply, these plastic packaging materials are not biodegradable and thus they cannot avoid further multiplying our planet's already critical waste disposal problems. The non-biodegradability of these packaging materials has become increasingly important in light of many industries adopting more progressive policies in terms of environmental responsibility.

These and other disadvantages of conventional plastic packaging materials have made paper protective packaging material a very popular alterative. Paper is biodegradable, recyclable and renewable; making it an environmentally responsible choice for conscientious companies.

While paper in sheet form could possibly be used as a protective packaging material, it is usually preferable to convert the sheets of paper into a low density cushioning product. This conversion may be accomplished by a cushioning conversion machine, examples of which are disclosed in U.S. Pat. Nos. 4,026,198; 4,085,662; 4,109,040; 4,237,776; 4,557,716; 4,650,456; 4,717,613; 4,750,896; and 4,968,291. These cushioning conversion machines convert sheet-like stock material, such as paper in multi-ply form, into low density cushioning pads. The pads produced by these machines each have lateral pillow-like portions separated by a thin central band, and the pads may be of a variety of lengths.

In the above-discussed cushioning conversion machines (and in many other cushion-creating machines), the pads are discharged in a predetermined discharge direction through an outlet. Typically, the pads are discharged to a transitional zone from which the pads may later be removed at the appropriate time for insertion into a container for cushioning purposes.

In the past, a variety of arrangements have been used as transitional zones in packaging systems. For example, temporary receptacles (ie., bins) have been placed adjacent the machine's exit so that the pads can be discharged therein to form a pile. At the appropriate time, the packaging person would reach into the transitional receptacle, retrieve a pad from the accumulated pile, return to his/her workstation and then insert the pad in the container.

Additionally, horizontal packaging surfaces (i.e., tables) have been employed as transitional zones. Specifically, the horizontal surface is positioned so that the pads are deposited thereon. When a packaging need arises, the packaging person picks up the pad from the transitional surface and then, if the transitional surface also functions as a workstation, immediately inserts the pad in the container.

Slides also have been used as a transitional zone for a cushion-creating machine. One such slide consisted of a semi-cylindrical conduit having a width just slightly greater than the width of the pads. The slide was positioned adjacent to the machine so that its top portion was proximate to the machine's exit whereby the discharged pads would be deposited thereon. Additionally, the slide was oriented relative to the machine so that it was longitudinally aligned with the product direction discharge. (In other words, the slide direction was a continuation of the machine's discharge direction.) In this manner, the discharged pads stacked end-to-end in the conduit and, at the appropriate time, the bottom pad would be removed and used for cushioning purposes. After the bottom pad was removed, the other pads on the slide would slide down, thereby presenting a next pad for removal.

These and other transitional zones have all performed quite successfully in a variety of packaging systems and likely will continue to do so in the future. However, a certain packaging situation has recently arisen which has some special transitional needs. Particularly, this packaging situation requires a transitional zone which automatically sequentially provides a single pad in an orderly fashion for pick-up, while occupying a minimal amount of space and maximizing packaging efficiency.

None of the above-discussed transitional zones appears to be capable of satisfying these specific transitional requirements. Specifically, a temporary receptacle (i.e., a bin) will not present the pads in an orderly fashion because they are simply accumulated in a pile. Moreover, many space-conserving forms of receptacles require a packaging person to bend over to retrieve a pad. While a transitional horizontal surface (i.e., a table) may be designed to eliminate the need for a packaging person to bend over, the pads will still be accumulated in a pile and may even fall off the surface in a high volume situation.

Regarding the transitional slide described above, it presents the pads in an orderly, sequential fashion. However, the pads are stacked end-to-end and, as a consequence of this, less than careful removal of the pad at the lower end of the slide might cause the next pad to be inadvertently dislodged from the chute, with the dislodged pad falling from the chute or otherwise not being properly positioned for easy and quick pick-up.

SUMMARY OF THE INVENTION

According to the present invention, advantages are obtained by presenting only a single pad at a pick-up location at the lower end of an inclined slide or chute to facilitate easy, quick and error-free removal of the pad. This eliminates the problem of a subsequent pad being dislodged when removing a pad from the pick-up location. When the pad is removed, a next pad is immediately formed and presented at the pick-up location.

A packaging system and method according to the invention are generally characterized by a cushioning conversion machine for forming and dispensing cut sections of a cushioning product through a discharge outlet, an inclined dispensing chute for sequentially receiving the cut sections of the cushioning product, a cut section presence detector for detecting the presence of a cut section on the inclined chute at a pick-up location remote from the discharge outlet of the conversion machine, and a controller which initiates dispensing of a cut section of cushioning product in response to a detected absence of a cut section by the cut section presence detector.

In a preferred embodiment of the invention, the dispensing chute, which is located adjacent the discharge opening for receiving the cut sections of the cushioning product, has a downwardly sloped bottom surface onto which the cut section of the cushioning product is deposited for sliding by gravity to a lower end of the dispensing chute where an abutment forms a stop engageable by a leading end of the cut section. The abutment or stop thus prevents further downward movement of the cut section and thereby holds the cut section at the pick-up position. The chute also preferably has upright side walls for guiding the cut section along the sloped bottom surface and a downwardly inclined top wall adjacent the discharge outlet of the conversion machine. The inclined top wall is positioned in the path of the cushioning product exiting the discharge outlet of the conversion machine for deflecting the cushioning product downwardly toward the sloped bottom surface. The chute at its lower end has an open top through which the cut section may be removed form the chute. As is preferred, the open top has a length slightly less than the length or range of lengths of cut sections to be dispensed, such that a trailing end of the cut section will be overlapped by the top wall adjacent the top opening when the leading end of the cut section is resting against the abutment. This permits convenient mounting to the top wall of a proximity sensor which functions to detect the presence of a cut section at the pick-up location.

The foregoing and other features of the invention are hereinafter more fully described and particularly pointed out in the claims. The following description and annexed drawings set forth in detail an illustrative embodiment, this embodiment being indicative of but one of the various ways in which the principles of the invention may be employed.

BRIEF DESCRIPTION OF THE DRAWINGS

FIG. 4 is a plan view of the inclined chute.

FIG. 5 is a side view of the inclined chute.

DETAILED DESCRIPTION

Figure 1:
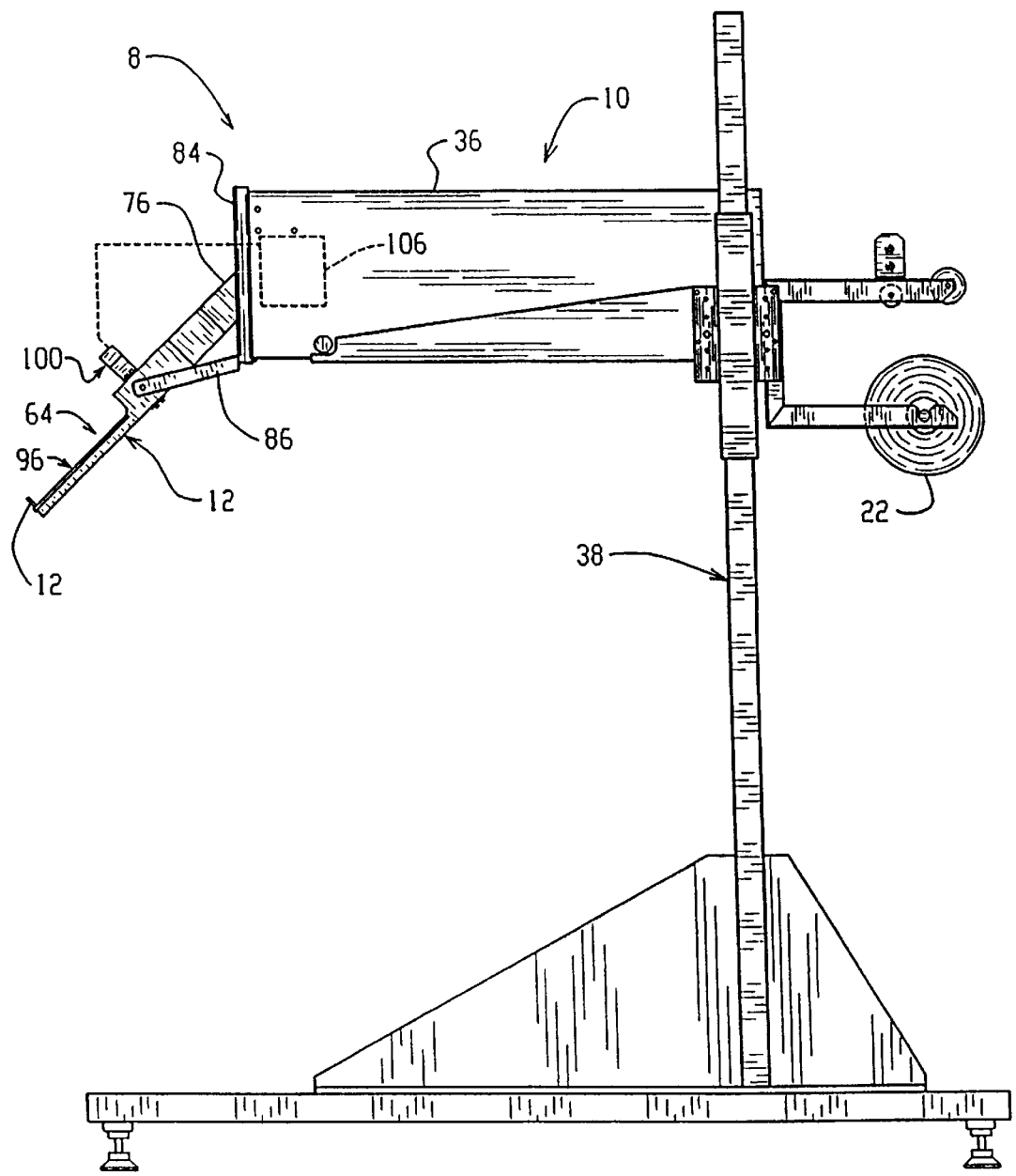
FIG. 1 is a side elevational view of a packaging system according to the present invention, the system including a cushion-creating machine and an inclined chute.
Figure 2:
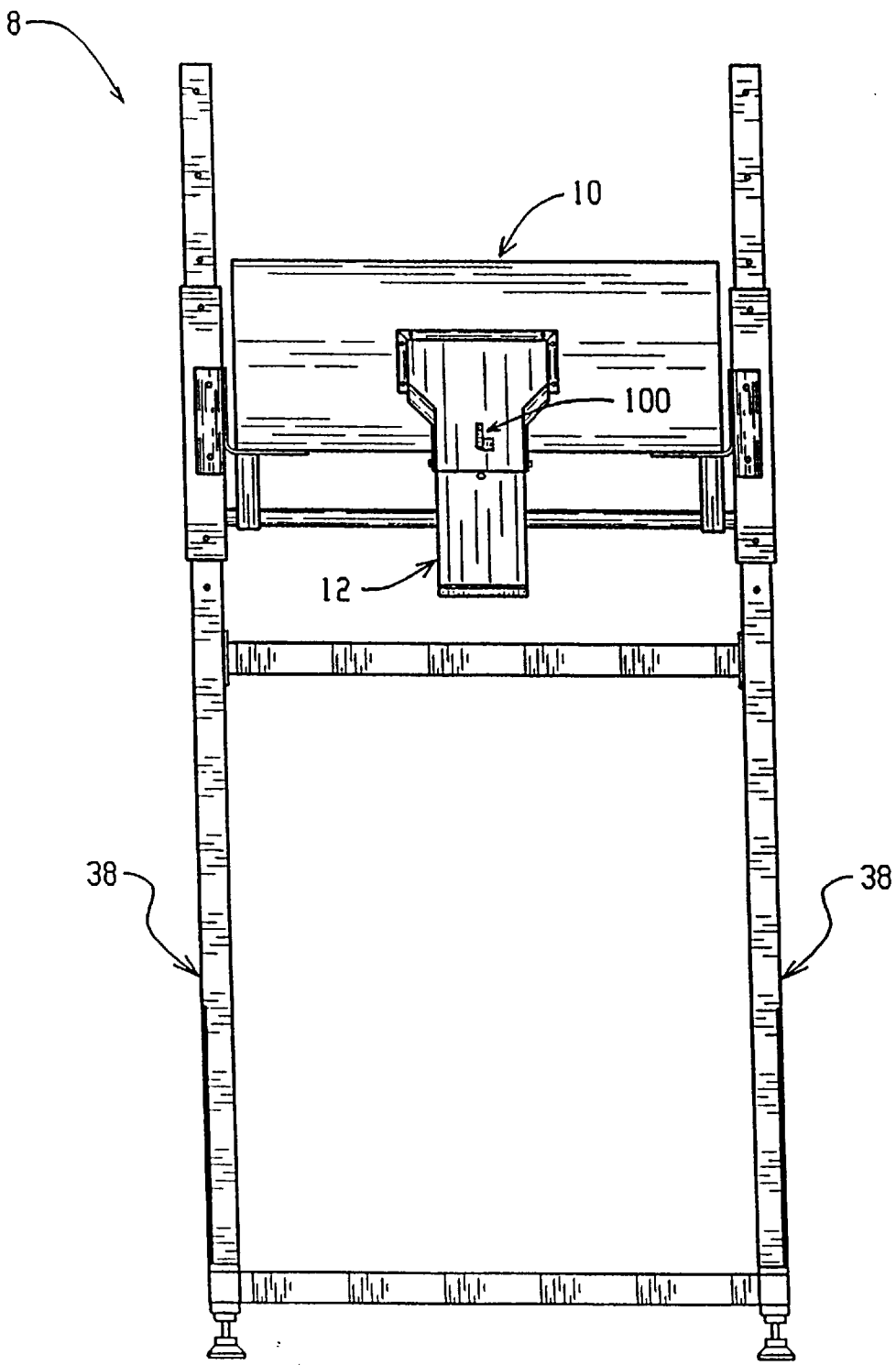
FIG. 2 is a front elevational view of the packaging system.

Referring now to the drawings in detail and initially to FIGS. 1 and 2, a packaging system according to the present invention is shown generally at 8. The packaging system 8 includes a cushion-creating machine 10 and an inclined chute 12 which is positioned adjacent and preferably attached to the machine 10. As is explained in more detail below, the inclined chute 12 provides a transitional zone which presents cut sections of a cushioning product, hereinafter also referred to a pads, in an orderly sequential fashion for pick-up, which occupies a minimal amount of space, and which maximizes packaging efficiency.

In the illustrated and preferred embodiment of the invention, the cushion-creating machine 10 is a cushioning conversion machine which is shown loaded with a roll of sheet-like stock material 22. The stock material 22 may consist of three superimposed webs of biodegradable, recyclable and reusable thirty-pound Kraft paper rolled onto a hollow cylindrical tube. The machine 10 converts this stock material 22 into cushioning products, or pads, of a desired length.

Figure 6:
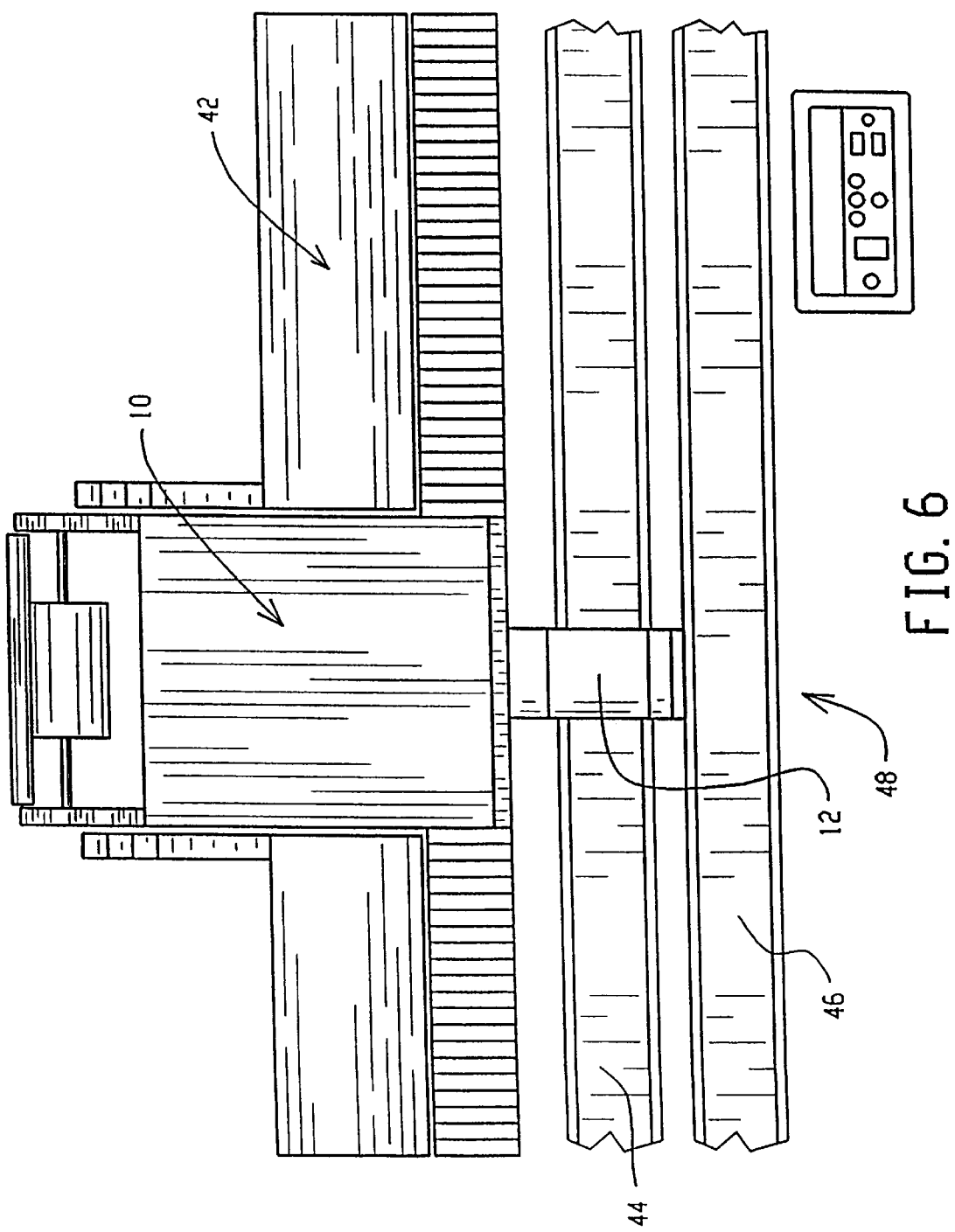
FIG. 6 is a plan view of a packaging system installation.

The machine 10 comprises a housing 36 and cushion-creating assemblies which are mounted in the housing and which create the pads. In the illustrated embodiment, the machine is supported between a pair of uprights 38 forming a stand. The position of the machine may be adjusted up and down along the uprights for adjusting the height of the machine 10, so as to position chute 12 at a desired height, as in the manner described in greater detail in U.S. Pat. No. 5,322,477. Unlike the mounting arrangement shown in said patent, the machine in the illustrated preferred embodiment is supported by the uprights at its rear end and cantilevered forwardly from the uprights, as is desired for spanning a conveyor, packaging table or other structures disposed therebeneath, as illustrated in FIG. 6. In FIG. 6, the machine 10 extends over a packaging table 42 with the inclined chute 12 projecting over a return conveyor 44 to a point disposed above a main conveyor 46 along which packages travel through a packaging station 48. At the packaging station, the pads are removed from a pick-up location at the lower end of the chute and placed in the packages traveling along the conveyor 46. The lower edge of the chute may be about four feet above the floor which is a convenient height for someone sitting on a chair in front of the conveyor.

Figure 3:
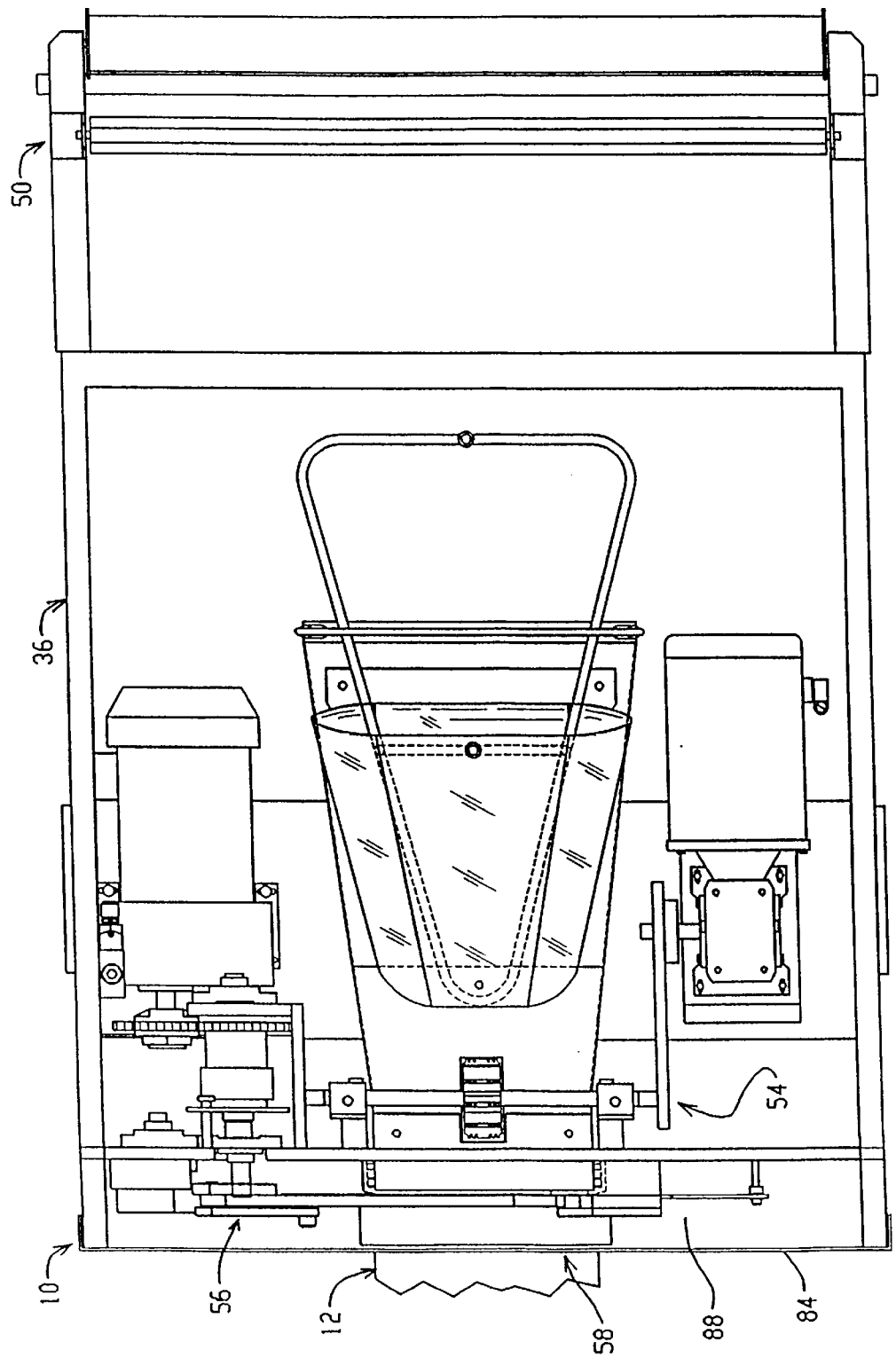
FIG. 3 is a top plan view of the cushion-creating machine with the top thereof removed to permit viewing of internal components thereof.

As shown in FIG. 3, the cushion-creating assemblies include a stock supply assembly 50, a forming assembly 52, a gear (feed) assembly 54, and a cutting assembly 56, all of which are mounted in or to the housing 36. The illustrated forming assembly includes a shaping chute and former for forming a normal width pad. However, the shaping chute may have mounted therein or be replaced by a narrower width forming assembly of the type shown in U.S. patent application Ser. No. 08/410,048 which produces a narrower width pad and which is hereby incorporated herein by reference. The illustrated chute is sized to receive the narrower width pad of said application.

During operation of the machine 10, the stock supply assembly 50 supplies the stock material 22 to the forming assembly 52. The forming assembly 52 causes inward rolling of the lateral edges of the sheet-like stock material 22 to form a continuous strip having lateral pillow-like portions and a thin central band. The gear assembly 54 pulls the stock material 22 downstream through the machine and also coins the central band of the continuous strip to form a connected strip. As the connected cushioning strip travels downstream from the gear assembly 54, the cutting assembly 56 cuts the strip into pads 32 of a desired length. The pads exit through a discharge outlet 58 and are deposited onto the chute 12 at the downstream end of the machine.

With additional reference to FIGS. 4 and 5, the chute 12 includes a smooth sloped bottom surface 60 which forms the transitional zone for the packaging system. The upper end of the surface 60 is positioned proximate to the machine's discharge outlet 58 so that the discharged pads will be deposited thereon. (See FIG. 1.) The sloped surface 60 has a slope (relative to horizontal) which is sufficient to insure that a pad deposited thereon at its upper end 62 will slide downwardly therealong to a pick-up position 64 at the lower end of the chute. The pitch angle of the illustrated chute is about 45° (see FIG. 1), but the angle may be varied as desired generally within a range of about 20° to about 70°. The bottom surface 64 is bounded by side walls 68 which guide the pad as it slides downwardly along the bottom surface. The side walls preferably are laterally spaced apart a distance slightly greater than the desired width of the pad produced by the machine such that the pad is guided for end-wise movement along the bottom surface. In FIGS. 4 and 5, a pad is depicted by phantom lines at 70. At their upper end portions, the side walls are flared outwardly to provide a wide mouth for receiving the cushioning strip exiting through the discharge outlet of the machine 10.

The chute 12 further has a top wall 76 extending partway along the length of the chute parallel with the bottom wall 60. The top wall 76, bottom wall 60 and side walls 68 form a tubular upper portion 78 of the chute through which the pad is guided. At the upper end of the tubular portion 78, there is provided a mounting flange 80 along the sides and top and a hook flange 82 along the bottom for mounting to the front cover 84 (FIGS. 1 and 3) of the machine. The hook flange is offset from the mounting flange for catching the inner bottom side of an opening in the front cover 84 while the mounting flange is secured by suitable means such as fasteners or welding to the front cover. Also provided are support brackets 86 (FIG. 1) for securely mounting the chute to the front cover of the machine. As is conventional, the front cover 84 may be hinged to the bottom wall of the housing of the machine so that it can be opened to gain access to the interior region 88 (FIG. 3) of the housing containing the cutting blades of the cutting assembly 56 which cooperate to cut the pad from the connected strip of cushioning. In relation to existing conversion machines of the illustrated type, the chute is attached at the discharge outlet 58 of the machine where a post-cutting constraint typically is attached to the front cover, and in this regard it is noted that the tubular upper portion of the chute functions as a post-cutting constraint.

When mounted to the front cover 84 as shown in FIGS. 1 and 2, the top wall 76 of the chute 12 is disposed in the path of the cushioning strip exiting through the discharge outlet 58 (FIG. 3). As the cushioning strip is dispensed through the discharge outlet, it will engage the top wall and be deflected downwardly towards the bottom wall 64 of the chute. After the strip is cut, the then formed pad will drop onto the bottom wall and slide downwardly therealong until the leading end thereof engages an abutment 90 provided at the lower end the chute. As best shown in FIGS. 4 and 5, the abutment 90 defines the lower end of the pick-up position 64 for the pad at the lower end of the chute. The abutment in the illustrated embodiment is formed in part by an end wall 92 of the chute. The end wall 92 may have a stop plate 94 attached thereto which projects above the end wall to ensure that the pad cannot slide past the end of the chute, and thus the stop plate forms a part of the abutment.

As shown at 96 in FIGS. 4 and 5, the lower end of the chute has an open top to permit removal of the pad at the pick-up position. Also, the side walls 68 of the chute preferably are notched at their lower end portions extending along the pick-up position 64 such that an upper portion of the pad 70 will project above the upper edges 98 of the notched or reduced height side wall portions to facilitate easier grasping of the pad by a packaging person.

When a pad is removed from the pick-up location, the absence of the pad is detected by a pad presence detector 100 (FIGS. 1 and 2). The detector may be of any suitable type operable to provide an output indicative of the absence of a pad in the pick-up location 64. In the illustrated embodiment, the detector is a retro-reflective photoelectric detector conveniently mounted to the top wall of the chute 12 adjacent the upstream end of the opening 96 through which the pad is withdrawn. The detector is positioned so as to detect the presence of the trailing end of the pad when the leading end of the pad rests against the abutment 90. When the detector no longer detects the presence of a pad at the pick-up location, an output indicative thereof is supplied via conventional means to a controller 106 for the machine to initiate feeding of a predetermined length of cushioning strip and then cutting of the strip to form a pad (cut section). The controller 106 may be a conventional EDS controller employed in machines manufactured by Ranpak Corp. of Concord Township, Ohio. After the strip is cut, it slides down the chute to the pick-up position where its presence is detected by the pad presence detector. If the length of the pad relative to the length of the chute and spacing of the detector from the outlet of the machine is such that the cushioning product will not have moved past the detector before completion of a feed/cutting cycle, the controller may be provided with an appropriate delay before a next feed/cutting cycle can be initiated to allow sufficient time for a cut pad to move into the pick-up position.

Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. A packaging system comprising a cushion creating machine for forming and dispensing cut sections of a cushioning product through a discharge outlet, an inclined dispensing chute for sequentially receiving the cut sections of the cushioning product, a cut section presence detector for detecting the presence of a cut section on the inclined chute at a pick-up location remote from the discharge outlet of the machine, and a controller which initiates dispensing of a cut section of cushioning product in response to a detected absence of a cut section by the cut section presence detector.

2. A packaging system as set forth in claim 1, wherein said dispensing chute has a sloped bottom surface onto which the cut section of the cushioning product is deposited for sliding by gravity to a lower end of said dispensing chute, and an abutment at the lower end of said dispensing chute disposed above said sloped bottom surface to form a stop engageable by a leading end of the cut section to prevent further downward movement of the cut section and thus hold the cut section at a pick-up position.

3. A packaging system as set forth in claim 2, wherein said cut section presence detector is positioned along said sloped bottom surface such that it detects the presence of a cut section on said sloped bottom surface at the pick-up location, and said controller includes control circuitry operative to initiate dispensing of the cushioning product and cutting of a section thereof in response to the detected absence of a cut section by said detector.

4. A packaging system as set forth in claim 1, wherein said chute includes a sloped bottom wall and opposite side walls which guide the cut section along the bottom wall.

5. A packaging system as set forth in claim 4, wherein the cushion-creating machine is a cushioning conversion machine which converts a sheet-like stock material into the cushioning products and which comprises a forming assembly which inwardly rolls the lateral edges of the sheet-like stock material to form a continuous strip having lateral pillow-like portions and a thin central band, a feed assembly which feeds the stock material through the forming assembly and which connects the continuous strip to form a connected strip, and a cutting assembly which cuts the connected strip into pads of a desired length.

6. A packaging method comprising the steps of providing a cushion creating machine for forming and dispensing cut sections of a cushioning product through a discharge outlet, the discharge outlet having located adjacent thereto the upper end of an inclined dispensing chute which sequentially receives the cut sections of the cushioning product; using a cut section presence detector for detecting the presence of a cut section on the inclined chute at a pick-up location remote from the discharge outlet of the machine, and using a controller to initiate dispensing of a cut section of cushioning product in response to a detected absence of a cut section by the cut section presence detector.

7. A packaging system, comprising: a cushioning conversion machine having a forming assembly which forms a sheet-like stock material into a continuous strip of cushioning, a feed assembly which feeds the stock material through the forming assembly and which connects the continuous strip to form a connected strip of cushioning, and a cutting assembly which cuts the connected strip into cushioning products of a desired length, and a discharge outlet through which the cushioning products exit the cushioning conversion machine; a dispensing chute adjacent the discharge outlet to which the cushioning conversion machine sequentially dispenses the cushioning products in an end-to-end relationship; a cushioning product presence detector which detects the presence of a cushioning product in the dispensing chute; and a controller which initiates dispensing of a cushioning product in response to a detected absence of a cushioning product by the cushioning product presence detector.

8. A packaging system as set forth in claim 7, wherein the cushioning product presence sensor detects the presence of the cushioning product at a pick-up location remote from the discharge outlet of the conversion machine.

9. A packaging system as set forth in claim 8, wherein the dispensing chute has a downwardly sloping bottom surface and an abutment at a lower end of the dispensing chute, the bottom surface being designed so that the cushioning product deposited thereon slides to the lower end of the dispensing chute where the abutment forms a stop which engages a leading end of the cushioning product to prevent further downward movement of the cushioning product, the abutment also forming the lower end of a pick-up position for the cushioning product.

10. A packaging system as set forth in claim 9, wherein the abutment is fixedly mounted to the lower end of the dispensing chute.

11. A packaging system as set forth in claim 7, wherein the dispensing chute has upright side walls for guiding the cushioning product along a bottom surface.

12. A packaging system as set forth in claim 7, wherein the dispensing chute has a downwardly inclined top wall adjacent the discharge outlet of the conversion machine.

13. A packaging system as set forth in claim 12, wherein the dispensing chute has an open top at a lower end of the chute through which the cushioning product may be removed.

14. A packaging system as set forth in claim 7, wherein the conversion machine further includes a housing, and the forming assembly, the feed assembly, and the cutting assembly are enclosed within the housing, the housing having an opening therein which forms the discharge outlet.

15. A packaging system as set forth in claim 7, further comprising a stand which supports the conversion machine at an elevated position.

16. A packaging system as set forth in claim 15, wherein the conversion machine is adjustably supported by the stand in a plurality of positions.

17. A packaging system as set forth in claim 15, wherein a rear end of the conversion machine is supported by the stand such that the conversion machine is cantilevered forwardly from the stand to extend the dispensing chute away from the stand.

18. A packaging system as set forth in claim 7, wherein the forming assembly rolls lateral edges of the stock material to form a continuous strip of cushioning having lateral pillow-like portions and the feed assembly connects the strip of cushioning to form a central band between the lateral pillow-like portions.

19. A packaging system as set forth in claim 7, wherein a bottom wall of the dispensing chute is inclined at an angle within the range of about 20° to about 70° relative to horizontal.

20. A packaging system as set forth in claim 19, wherein the bottom wall of the dispensing chute is inclined at an angle of about 45° relative to horizontal.

* * * * *